United States Patent [19]

Lindberg

[11] 4,277,216
[45] Jul. 7, 1981

[54] TRANSPORT ARRANGEMENT FOR TRAYS AND THE LIKE

[76] Inventor: Gunnar V. Lindberg, Box 137, 162 12 Vällingby, Sweden

[21] Appl. No.: 24,687

[22] Filed: Mar. 28, 1979

[30] Foreign Application Priority Data

Apr. 3, 1978 [SE] Sweden .............................. 7803738

[51] Int. Cl.³ ........................ B65G 1/00; B65G 65/00
[52] U.S. Cl. .................................. 414/331; 414/285; 414/400
[58] Field of Search ................ 414/331, 278, 285, 400

[56] References Cited

U.S. PATENT DOCUMENTS

| 2,869,739 | 1/1959 | Davis | 414/331 |
| 3,075,656 | 1/1963 | Pearne | 414/331 |
| 3,637,095 | 1/1972 | Kampfer | 414/331 |
| 4,032,027 | 6/1977 | Lindberg | 414/400 |

FOREIGN PATENT DOCUMENTS

142941 12/1961 U.S.S.R. .................................. 414/278

Primary Examiner—Leslie J. Paperner
Assistant Examiner—L. E. Williams
Attorney, Agent, or Firm—LeBlanc, Nolan, Shur & Nies

[57] ABSTRACT

A tray transport device for transferring trays in one direction or the other between a tray transport trolley and a conveyor for delivering or carrying trays from the transport device. The transport device includes vertical members which supports sets of horizontal parallel tray carrying strips which are disposed essentially parallel to a plurality of vertical sets of tray rails in a tray trolley. The sets of carrying strips are vertically shiftable by a drive into different height positions corresponding to levels of the trays in a trolley. The uppermost height position is level with the delivery station of a belt conveyor. A horizontal continuous belt conveyor located below and between the tray strips is also vertically shiftable as a unit to a plurality of levels equal to the tray levels in the trolley and is horizontally shiftable as a unit to be moved between and under any selected level of trays in the trolley to shift trays from the trolley to the tray carrying strips. An automatic control is provided for the transport device and enables functioning for loading and unloading trays from a trolley.

3 Claims, 27 Drawing Figures

Fig_11a

Fig_11b

Fig_11c

Fig_11d

Fig_11e

Fig_11f

TRANSPORT ARRANGEMENT FOR TRAYS AND THE LIKE

BACKGROUND OF THE INVENTION

This invention relates to an arrangement for the transport of trays and the like and, more precisely, relates to an arrangement for transporting trays and the like in one direction or the other between a tray trolley and a conveying path.

It is previously known at the transport of trays in the direction from the tray trolley to the conveying path to use a device, which comprises a pair of mutually spaced posts and to attach to the post surfaces facing toward each other a carrying strip, which strips are located at the same height on the posts and can be moved synchronously upward and downward and be adjusted to different levels. In the space between the posts and the carrying strips a horizontal conveyor with a length sufficient to permit the conveyor to be both within said space and to reach into a tray trolley is movable both horizontally and vertically for transporting trays from the tray trolley to said pair of carrying strips, which thereafter transport trays upward to a place of delivery or a belt conveyor of higher location. It is, thus, necessary for every tray or pair of trays to lower the pair of carrying strips to the level of the horizontal conveyor for receiving trays, whereafter the strips must transport the tray or tray pair upward to the place of delivery. This requires a very complicated drive means for correctly adjusting the pair of carrying strips to different receiving levels and, besides, the time required for moving the carrying strips is longer than desirable. It is also known, instead of one pair of carrying strips to attach a great number of carrying strips to vertical endless chains in such a manner, that the distance between the carrying strips is adjusted so that on each strip pair a single tray is received. The trays vertically stacked in the tray trolley then all at one time are moved over to the carrying strip pairs on the vertical chains and transported gradually to the place of delivery. This method proceeds rather quickly, but the arrangement is adapted for emptying only, not for filling a tray trolley.

SUMMARY OF THE INVENTION

The present invention has the object to provide an arrangement, by which trays and the like can be transported advantageously rapidly, which can be used for loading and unloading in connection with a tray trolley by adjusting the drive direction for the means, by which the trays are moved, and at which most of the arrangement details can be manufactured in series and be assembled irrespectively of the tray size, for which the arrangement is intended to be used.

This object is achieved according to the present invention by an arrangement, which has the characterizing features defined in the attached claims.

An embodiment of the invention is described below and illustrated by way of example in the accompanying drawings, in which.

Figure 1:
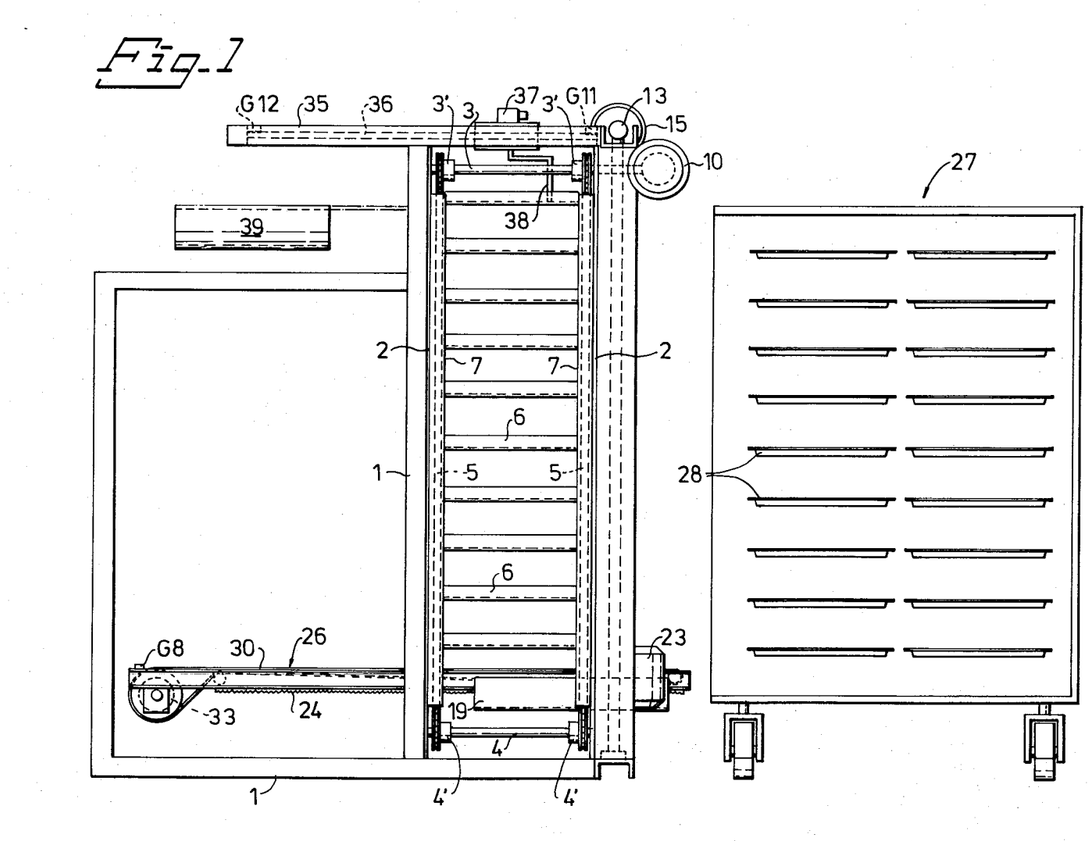
FIG. 1 is a lateral view of a tray unloader according to the invention and of a tray trolley shown schematically by way of cross-section.
Figure 2:
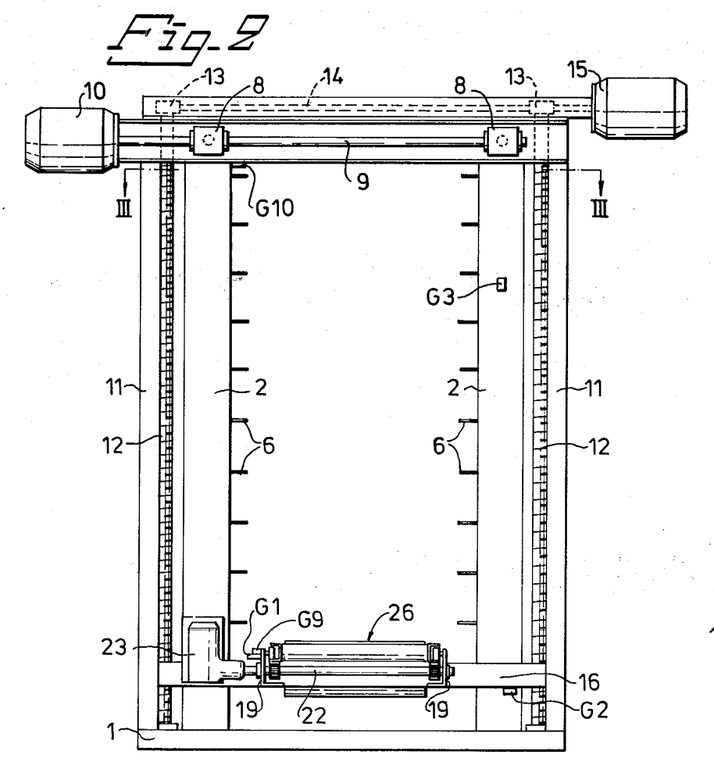
FIG. 2 is a view from the right in FIG. 1 of the tray unloader.
Figure 3:
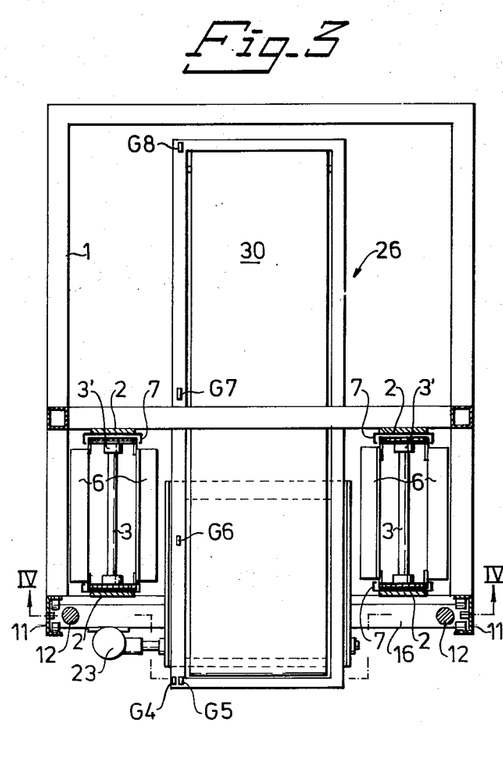
FIG. 3 is a horizontal section taken on line III—III in FIG. 2.

The tray unloader shown in FIGS. 1-3 comprises a stand 1 formed substantially of square tubes and U-shaped bars, in which stand four vertical beams 2 with rectangular cross-section are attached. In the beams 2 attached in pairs two upper axles 3, and vertically below the same two lower axles 4 are mounted. Each of said axles 3,4 in FIG. 1 supports two sprockets 3' and, respectively, 4' mounted in spaced relationship. An endless chain 5 is laid about an upper sprocket 3' and a lower sprocket 4', so that on each pair of axles 3,4 two pairs of chains 5 are located. A plurality of equally spaced carrying strips 6 with angular cross-section are attached to each chain pair 5. The chains 5 are guided in slide strips 7 secured in the beams 2. The two upper axles 3 are in driving connection via speed gears 8, FIG. 2, to a motor shaft 9 of an electric motor 10, so that the chains 5 are driven synchronously. The details 2-10 form a vertical conveyor, in which the length of the carrying strips and the horizontal distance between opposed carrying strips are adjusted to the transport of a single tray per pair of carrying strips.

Two spaced lateral posts 11 with U-shaped cross-section are rigidly connected to the stand 1 and mounted adjacent the vertical conveyor. Close to each lateral post 11 a vertical screw spindle 12, preferably of ball screw type, is attached, which are driven via a gear 13 located at the upper portion of the lateral posts on a motor shaft 14 to an electric motor 15.

Figure 4:
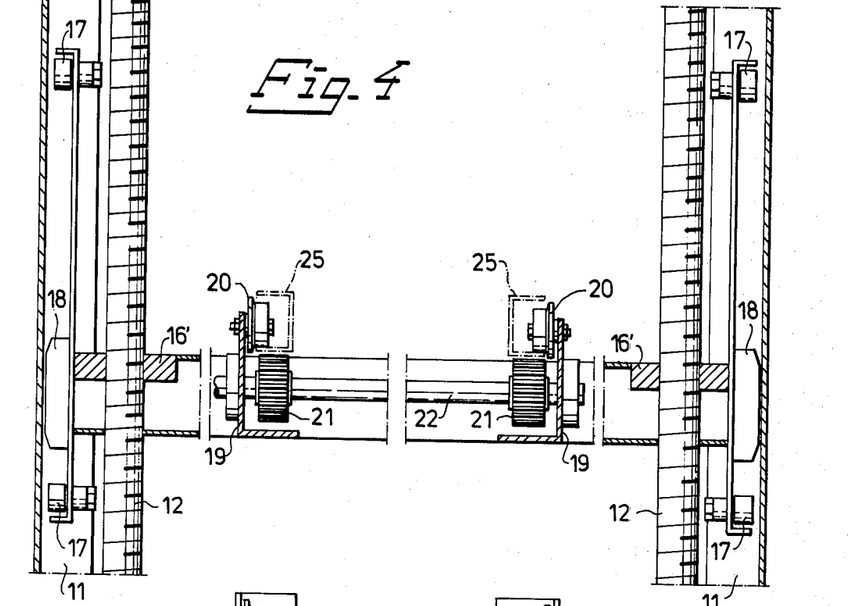
FIG. 4 is a portion of a vertical section on a larger scale taken on line IV—IV in FIG. 3, some details having been cut away.
Figure 5:
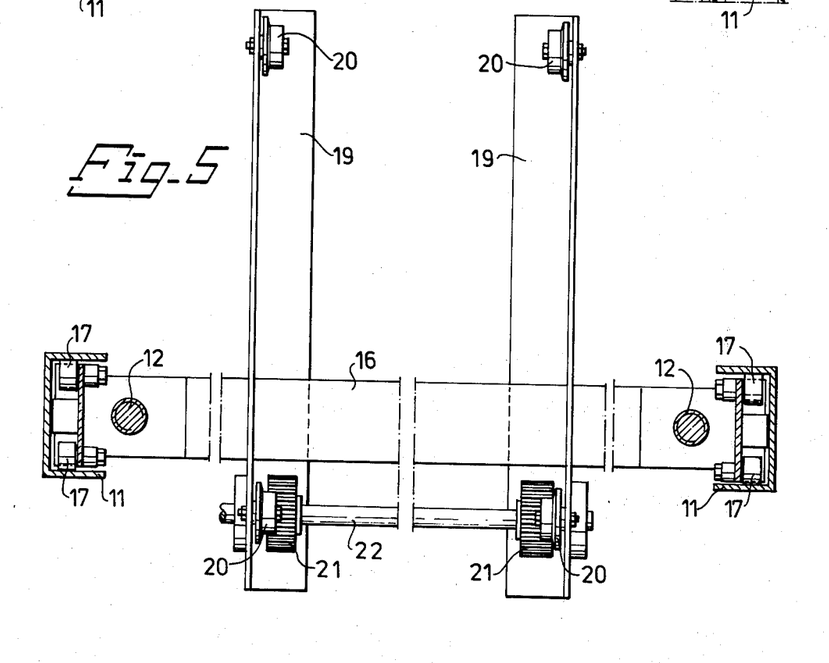
FIG. 5 is a plan view of the detail arrangement in FIG. 4.

A horizontal cross-beam 16 extends between the lateral posts 11 and guided against the same, see also FIGS. 4,5, which cross-beam is in thread engagement with the screw spindles 12, in that the cross-beam 16 at each end is provided with a nut 16', FIG. 4, engaging with the respective screw spindle 12. The cross-beam 16, besides, is provided at each end with four guide rollers 17 against flanges of the lateral posts 11 and a distance piece 18 serving as a slide shoe against the central portion of the lateral posts 11.

Two horizontal carrying bars 19 are rigidly connected to the cross-beam 16. Close to the ends of each of said bars 19 a support roller 20 is mounted, and vertically beneath each support roller a carrying roller 21 is provided, only two of which are visible in FIGS. 4,5, and mounted on a motor shaft 22, which is supported in the carrying bars 19 and extends from an electric motor 23 attached to the crossbeam 16, FIGS. 1-3. The two carrying rollers 23 attached on the motor shaft also are designed as gear wheels meshing each with a rack 24 on the lower surface of a horizontal frame 25 for a horizontal conveyor 26, FIG. 1.

Figure 6:
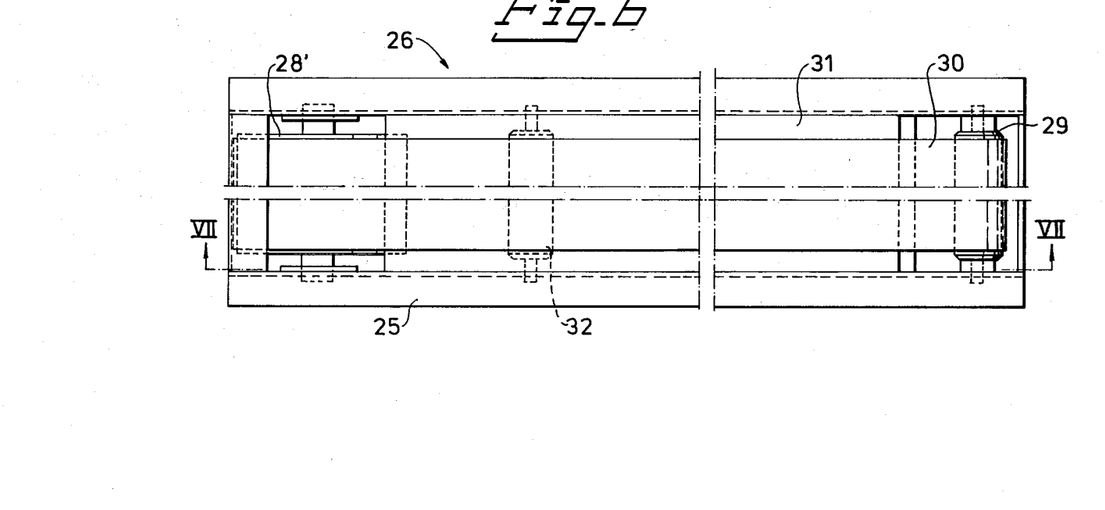
FIG. 6 is a plan view of a horizontal conveyor in the tray unloader (certain central portions of the conveyor having been cut away)
Figure 7:
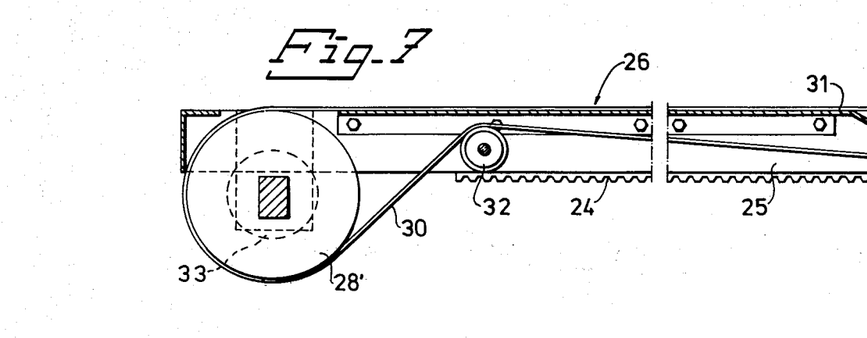
FIG. 7 is a vertical longitudinal section taken on line VII—VII in FIG. 6.
Figure 8:
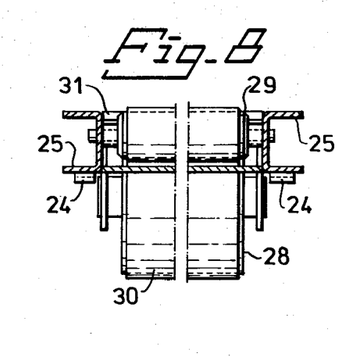
FIG. 8 is a vertical cross-section taken on line VIII—VIII in FIG. 7.

The horizontal conveyor 26 is more clearly shown in FIGS. 6-8. The rectangular frame 25 has a length sufficient to extend into a tray trolley 27, schematically indicated in FIG. 1, and also below two trays 28 positioned in transverse direction of the trolley 27. Inside of each end of the frame 25 a roller 28 and, respectively, 29 are mounted, about which an endless conveyor belt 30 is laid, the upper strand of which rests on a carrying metal sheet 31 in the frame 25, and the lower strand of which is supported on one (or more) support rollers 32. Within the roller 28 an electric motor 33, schematically indicated in FIG. 7, for the roller 28, and therewith for the conveyor belt 30, is attached. Said belt 30 can be stretched by means of the movable roller 29.

The stand 1 in FIG. 1 carries on its upper portion a top frame 35 (not shown in the remaining Figures), in the central space of which two guide members 36 are attached and carry a linear motor 37, which encloses a horizontal bar (not shown) and is provided with a pull-off member 38, which upon movement of the linear motor is displaceable within the horizontal space between the carrying strips 6 and to and from a receiving conveyor or table 39.

Figure 9:
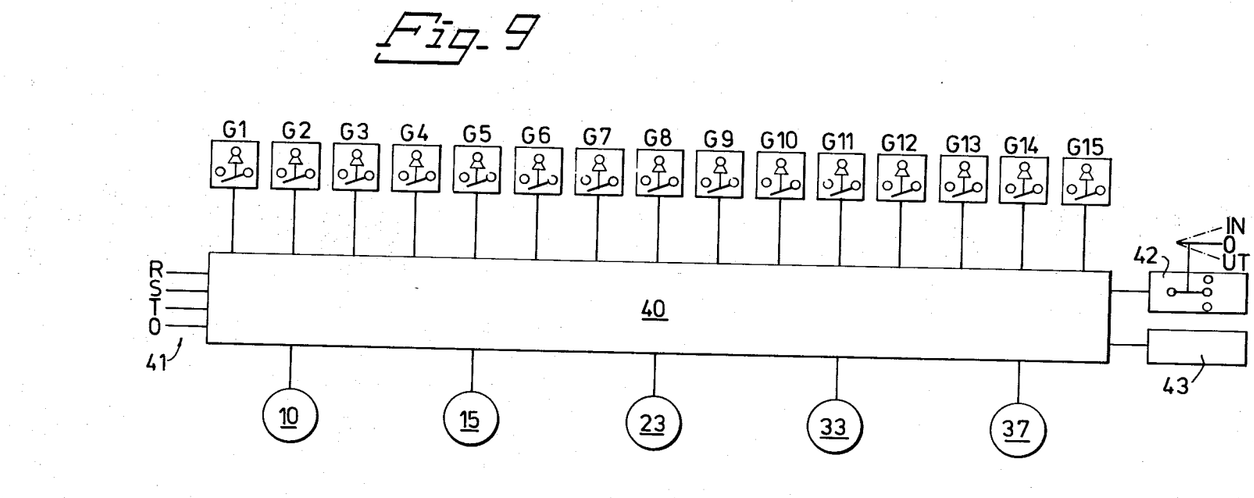
FIG. 9 is a block diagram of control components for the tray unloader and tray loader.
Figure 10A:
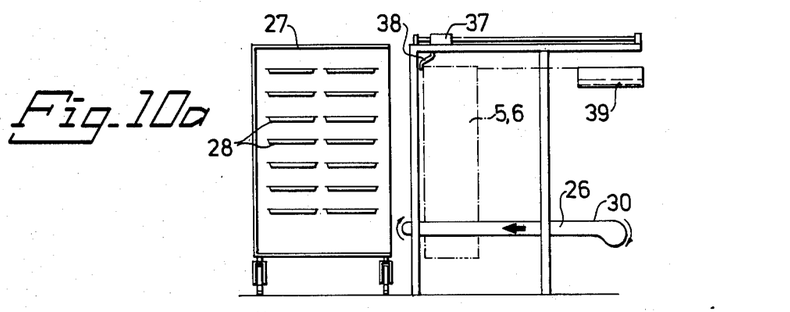
FIGS. 10a–10i show the operation scheme for the tray unloader.
Figure 10B:
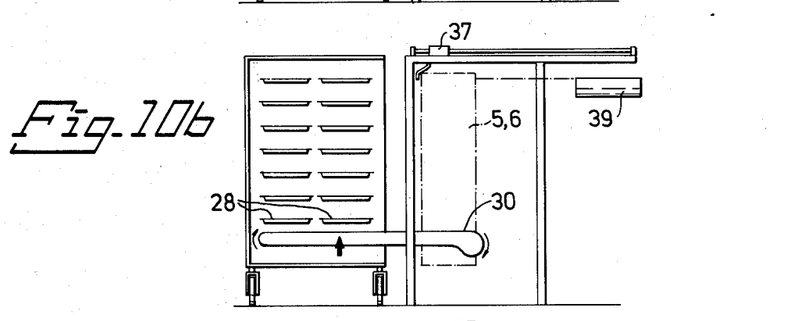
Figure 10C:
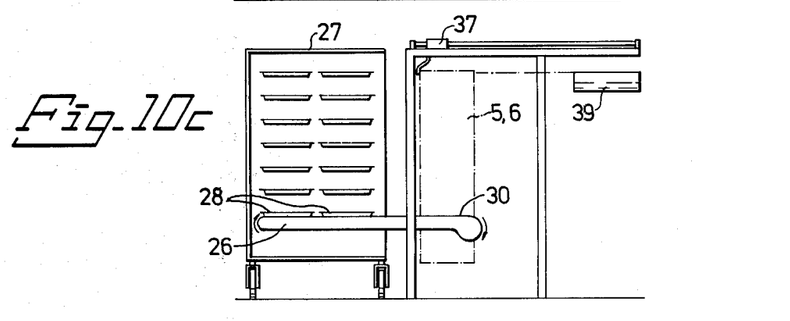
Figure 10D:
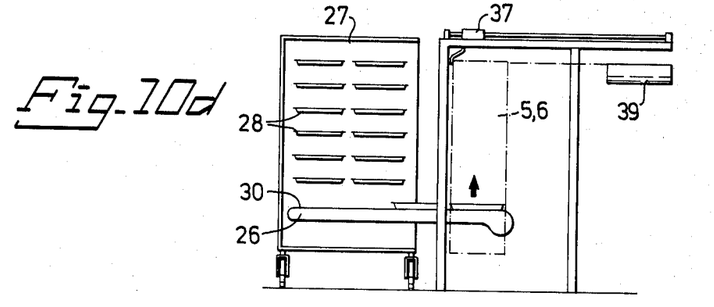
Figure 10E:
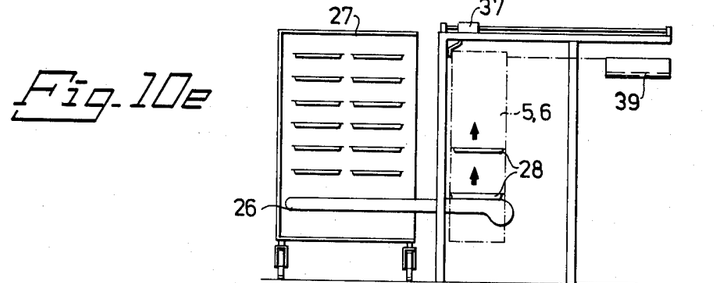
Figure 10F:
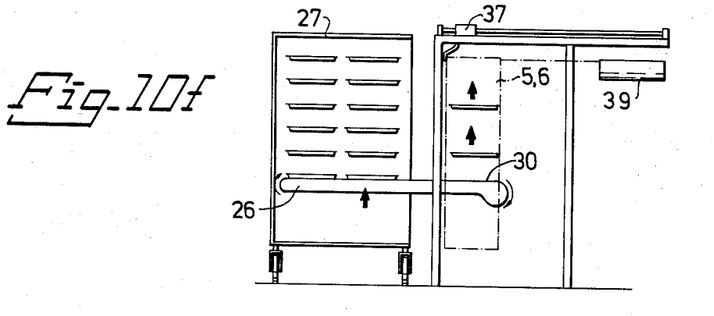
Figure 10G:
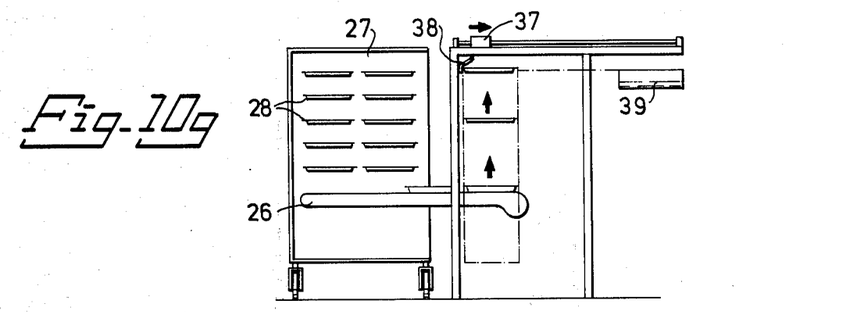
Figure 10H:
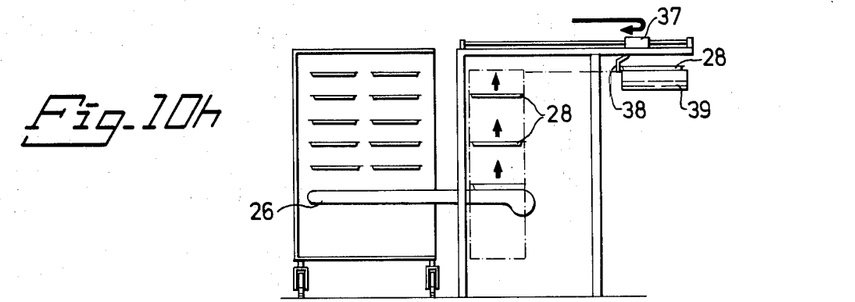
Figure 10I:
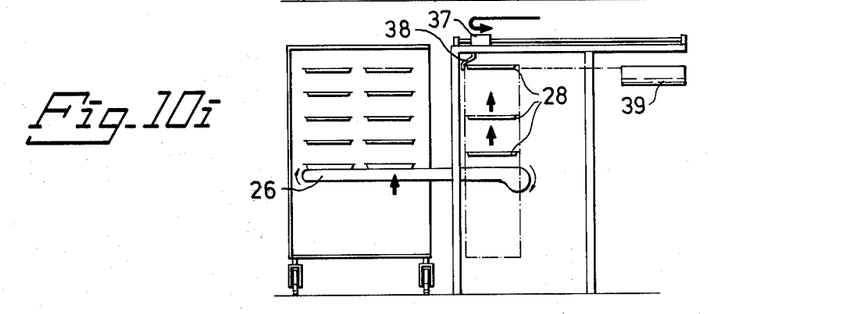
Figure 11A:
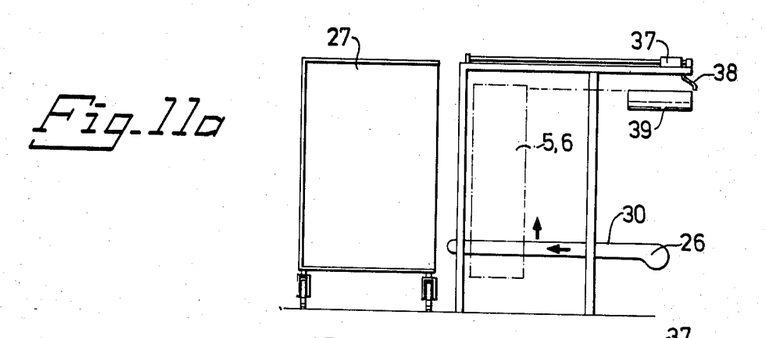
FIGS. 11a–11i show the operation scheme for the tray loader.
Figure 11B:
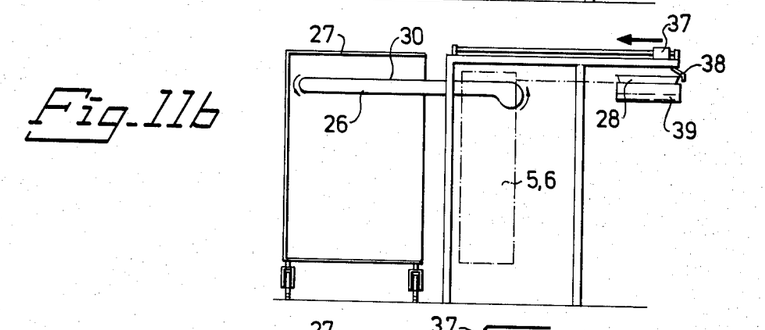
Figure 11C:
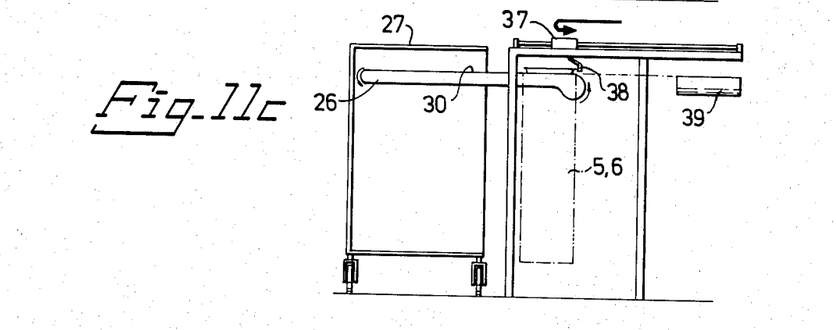
Figure 11D:
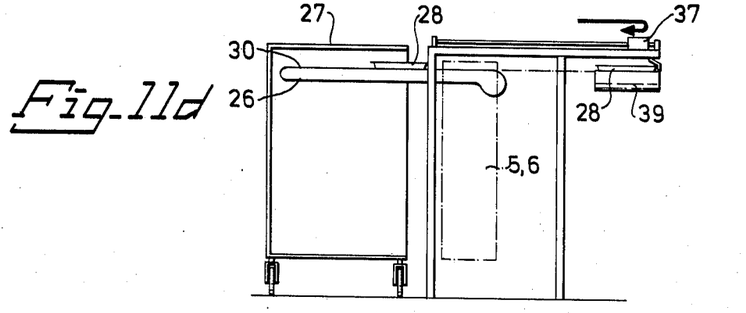
Figure 11E:
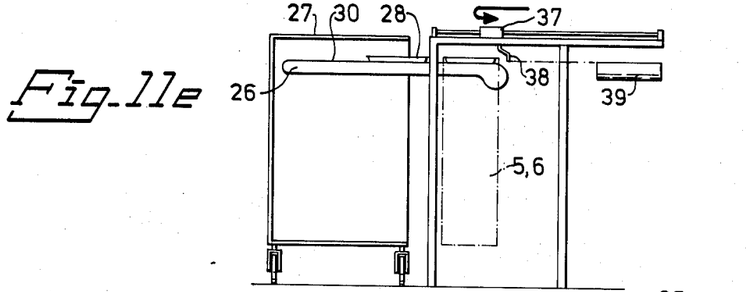
Figure 11F:
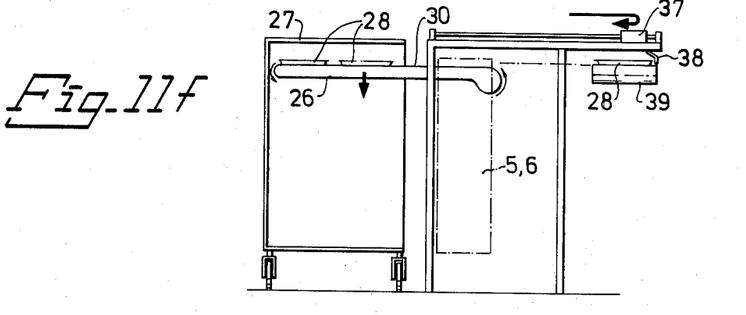
Figure 11G:
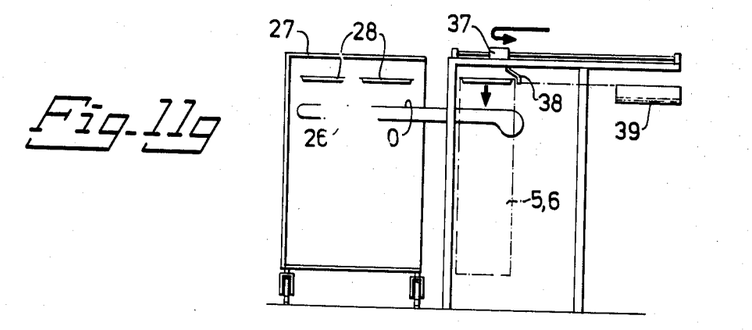
Figure 11H:
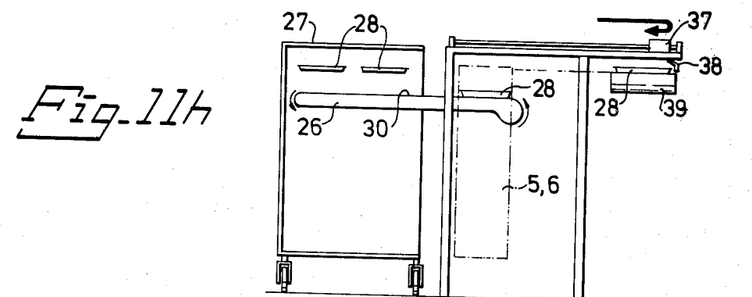
Figure 11I:
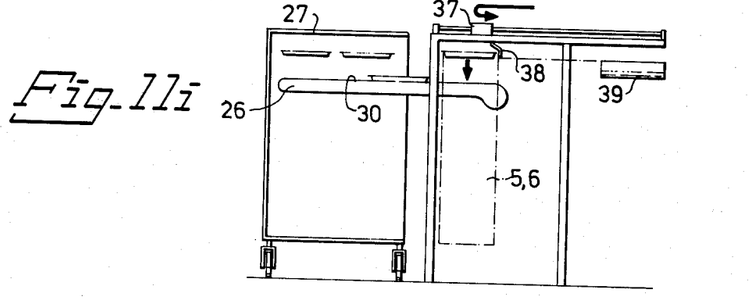

The block diagram shown in FIG. 9 is intended not only for the tray unloader described, but also for a tray loader. The diagram shows a control unit 40, which may be a relay set or a micro-computer of known kind with line connections 41, a selector switch 42 and a counting mechanism 43, and to which the motors 10,15,23,33,37, a magnet switch G1, limit switches G2,G3, photocells G4-G8, magnet switches G9-G12 and photocells G13-G15 are connected. The photocell G13 is intended to serve only for the tray loader.

Of the aforesaid control means, G1-G2 serving for the tray unloader are shown schematically in FIGS. 1-3. The starting position in the unloader is the one shown in FIGS. 1-3, in which position the horizontal conveyor 26 is in its lower retracted position, and the pulloff member 38 assumes a position farther to the right than for clarity reason shown in FIG. 1.

FIGS. 10a–i shown in a schematic manner an operation scheme for the tray unloader, which is shown reversed relatively in FIG. 1, and are intended to illustrate the operation as follows, with reference to FIGS. 1-3.

1. Manual start. Motor 23 starts, and the horizontal belt conveyor 26 moves into the trolley. Belt 30 is started, provided that the photocells G14 and G15 indicate the trolley being in correct position.
2. Motor 23 is stopped by magnet switch G1 on the carrying bar 19, and motor 15 starts, whereby the horizontal belt conveyor 26 moves upward.
3. Motor 15 is stopped by photocell G4 when photocell G5 or G6 on the frame 25 indicate trays being on the trolley guide.
4. Photocell G8 on the frame 25 stops motor 33, and thereby belt 30, and starts motor 10, and thereby vertical conveyor 56, which runs until it is stopped by magnet switch G9 on the carrying bar 19.
5. When photocell G8 is not actuated, motor 33 and belt 30 start and the next tray moves into the vertical conveyor. Point 4 is repeated. When no tray is indicated by photocell G7 on frame 25, also motor 15 starts, and the horizontal belt conveyor 26 moves upward when photocell G8 is not actuated.
6. Points 2 to 5 are repeated until all trays have been removed from the trolley.
7. When no carrying strips come into position for the horizontal conveyor 26, and this is indicated by the magnet switch G10 at the upper portion of stand 1, all motors are stopped, except motor 37, which starts and pulls out the tray onto a transport path 39.
8. When the pull-out member 37,38 arrives at its forward end position, magnet switch G12 on top frame 35 is energized, whereby the pull-out member 37,38 returns to its rearward end position, and at the same time all movements stopped in point 7 are re-started.
9. When the pull-out member has arrived at its rearward end position, magnet switch G11 on top frame 25 is energized, and points 7 and 8 are repeated until limit switch G3 on beam 3 indicates emptied trolley. G3 starts also motor 23 and motor 15, whereby the horizontal belt conveyor moves to its rearward lower end position where magnet switch G1 on frame 19 and limit switch G2 on beam 2 are broken.

FIGS. 11a–i shown in a schematic manner an operation scheme for a tray loader and illustrate the operation as follows.

1. The loader is started manually. Motor 23 and motor 15 start. The horizontal belt conveyor 26 moves into the trolley 27 and upward until magnet switch G1 and limit switch G3 stop.

Limit switch G3 stops motor 15 when the horizontal belt conveyor 26 is in its upper end position, whereafter motor 15 is reversed and lowers the belt conveyor until photocell G4 stops at the tray guide of the trolley.
2. The tray moves onto the conveyor belt 30, photocell G13 starts motor 37 of the pull-out member 38. Magnet switch G10 is actuated, i.e. the carrying strip is in correct position for the tray.
3. The tray in the vertical conveyor 5,6. Magnet switch G11 starts motor 10 and motor 37, and the pull-out member 38 returns to the rearward end position. Motor 10 runs until it is stopped by magnet switch G9. Photocell G8 is activated by the tray on the horizontal belt conveyor, and belt 30 starts by means of motor 33, which is stopped by photocell G7 when photocell G6 is not activated.
4,5,6. New tray on the conveyor belt. Points 2 and 3 are repeated. Motor 33 is not stopped by photocell G7, because tray 1 activates photocell G6. Conveyor belt 30 now is stopped by photocell G5, which simultaneously starts motor 15.
7. The horizontal belt conveyor moves downward and is stopped by photocell G4 at next guide in trolley 27.
8,9. Points 2 to 7 are now repeated until all trays are loaded.
10. After completed loading operation, the horizontal belt conveyor 26 returns to its rearward lower end position with motors 23 and 15, which are stopped by magnet switch G1 and limit switch G2. When the number of trays set is too high, the loading is stopped by limit switch G2, and the horizontal belt conveyor 26 moves to its rearward lower end position. Re-start now cannot occur unless by manual resetting.

The control unit 40, FIG. 9, is located in a separate cabinet. Therefore, when the unit is intended to be used for a tray unloader and a tray loader, all components shown in FIG. 9 (except the motors) are present, so that only the selector switch 42 has to be set either for unloading or for loading. When the control unit 40 is intended to serve only for an unloader, the selector switch 42, counting mechanism 43 and photocell G13 can be omitted. When the control is to serve only for a loader, the selector switch 42 can be omitted.

The arrangement according to the invention has the advantage, that the trays being in the transport trolley can be removed two by two and thereafter be transported rapidly one by one to a place of delivery, e.g. a transport path for the transport of trays one after the other, and that the unloading operation proceeds automatically until the entire trolley has been emptied. The arrangement according to the invention at its manufacture easily can be given suitable dimensions, depending on the size of the trays or the like to be transported. Furthermore, the arrangement according to the invention easily can be designed so as also to serve as a tray loader, substantially by changing the driving direction and the driving pace for the means transporting the trays or the like.

The invention is not to be regarded restricted to the embodiment described above and shown in the drawings, but can be modified within the scope of the invention. Especially the means for carrying and, respectively, lifting and lowering the horizontal conveyor as well as the location of the microswitches, photocells etc. can be modified.

I claim:

1. An arrangement for transferring trays and the like in one direction or the other between a trolley and a conveying path via a vertical conveyor located in a stand, the vertical conveyor comprising two pairs of endless vertical transport means, such as chains, with equally spaced horizontal carrying strips, the pairs of endless vertical transport means, between themselves defining a space, in which trays or the like can be supported by the carrying strips, a horizontal conveyor with a mechanically driven conveying belt and made with its length sufficient to carry two of the trays or the like along the conveying belt, means carrying said horizontal conveyor and enabling it to be shifted horizontally as well as vertically within said space, and a displacement member being located at the upper portion of the vertical conveyor, said horizontal conveyor carrying means being characterized in that: two laterally spaced apart vertical beams are secured on said stand, exterior of the vertical conveyor, with the spaced apart distance between beams being greater than the width of the horizontal conveyor; a cross-beam mounted horizontally between and with its ends engaging and guided for vertical movement in associated said vertical beams; a pair of vertical screw spindles engaging and in threaded drive engagement with said cross beam, each screw spindle secured to an associated said vertical beam; means to concurrently rotatably drive said screw spindles to vertically move said cross-beam; two horizontal carrying bars rigid on and disposed transversely of said cross-beam providing support means for the horizontal conveyor; an electric drive motor supported on said cross-beam; and drive means mounted on said carrying bars driven by said electric drive motor, engaging said horizontal conveyor and adapted to move said horizontal conveyor along its horizontal shift path.

2. A transfer arrangement as defined in claim 1, said horizontal conveyor comprising a rectangular frame with flanged side members; carrying rollers and supporting rollers rotatably mounted on said carrying bars for engaging said side members and enabling horizontal movement of said horizontal conveyor; said frame, on its lower surface including two racks extending in the longitudinal direction of the frame; said carrying rollers being gear wheels which mesh with said racks; and a motor driven shaft supported on the carrying bars, drivingly connected to said gear wheels and providing the rotatable mounting of said gear wheels on said carrying bars.

3. A transfer arrangement as defined in claim 1, wherein a control means is provided with a control unit connected to furnish power to all of the drive means and said control means includes magnet switches, limit switches and photocells electrically connected to said control unit and selectively mounted on said stand, on at least one of said vertical beams, on at least one of said carrying bars and on said horizontal conveyor; to enable said control unit to provide a predetermined selective control and operation of the drive means to automatically move trays in either direction between a trolley and a conveying path.

* * * * *

UNITED STATES PATENT AND TRADEMARK OFFICE
CERTIFICATE OF CORRECTION

PATENT NO. : 4,277,216
DATED : July 7, 1981
INVENTOR(S) : Gunnar V. Lindberg

It is certified that error appears in the above—identified patent and that said Letters Patent are hereby corrected as shown below:

Column 3, line 34 change "G1-G2" to --G1-G12--.

Column 4, line 14, change "beam 3" to --beam 2--.

Signed and Sealed this

Thirteenth Day of October 1981

[SEAL]

Attest:

GERALD J. MOSSINGHOFF

Attesting Officer     Commissioner of Patents and Trademarks